(12) United States Patent
Goliaszewski et al.

(10) Patent No.: US 7,205,344 B2
(45) Date of Patent: *Apr. 17, 2007

(54) CROSSLINKER FOR MODIFIED ASPHALT

(75) Inventors: Alan E. Goliaszewski, The Woodlands, TX (US); Paul R. Hart, Sugar Land, TX (US); Fang Deng, Ivyland, PA (US); Ping Lue, Boothwyn, PA (US)

(73) Assignee: General Electric Company, Fairfield, CT (US)

( * ) Notice: Subject to any disclaimer, the term of this patent is extended or adjusted under 35 U.S.C. 154(b) by 248 days.

This patent is subject to a terminal disclaimer.

(21) Appl. No.: 10/841,596

(22) Filed: May 7, 2004

(65) Prior Publication Data

US 2005/0032942 A1   Feb. 10, 2005

Related U.S. Application Data

(63) Continuation of application No. 10/634,472, filed on Aug. 4, 2003, now abandoned.

(51) Int. Cl.
*C08L 95/00* (2006.01)

(52) U.S. Cl. .............................. 524/68; 524/70; 524/71

(58) Field of Classification Search .................. 524/68, 524/70–71
See application file for complete search history.

(56) References Cited

U.S. PATENT DOCUMENTS

| | | | |
|---|---|---|---|
| 3,547,850 A | 12/1970 | Montgomery | |
| 3,803,066 A | 4/1974 | Petrossi | |
| 3,853,799 A * | 12/1974 | Behling et al. | 523/307 |
| 4,130,516 A | 12/1978 | Gagle et al. | |
| 4,242,246 A | 12/1980 | Maldonado et al. | |
| 4,259,468 A | 3/1981 | Kajiura et al. | |
| 4,273,685 A | 6/1981 | Marzocchi et al. | |
| 4,330,449 A | 5/1982 | Maldonado et al. | |
| 4,332,705 A | 6/1982 | Uffner | |
| 4,464,427 A * | 8/1984 | Barlow | 428/40.3 |
| 5,138,000 A | 8/1992 | Kramer | |
| 5,256,710 A | 10/1993 | Krivohlavek | |
| 5,698,651 A | 12/1997 | Kawasaki et al. | |
| 6,057,390 A * | 5/2000 | Loza et al. | 524/68 |
| 6,117,951 A | 9/2000 | Liu et al. | |
| 6,180,697 B1 | 1/2001 | Kelly et al. | |
| 6,407,152 B1 | 6/2002 | Butler et al. | |
| 6,486,236 B2 | 11/2002 | Wollum et al. | |
| 2005/0032941 A1 * | 2/2005 | Hart et al. | 524/59 |

FOREIGN PATENT DOCUMENTS

JP   11-12474   *  1/1999

OTHER PUBLICATIONS

Encyclopedia of Chemical Technology, vol. 3, Fourth Edition, "Asphalt", Speight, James G., Western Research Institute, pp. 689-724.

* cited by examiner

*Primary Examiner*—Peter Szekely
(74) *Attorney, Agent, or Firm*—Hoffman & Baron, LLP

(57) ABSTRACT

The present invention relates to compositions and methods for providing an improved means of modifying asphalt with a polymer. More particularly, this invention provides a crosslinking system to improve the properties of polymer modified asphalt. Compositions of the present invention contain asphalt, a rubber or elastomeric polymer, and a crosslinkable component, particularly a bismaleimide or a bismaleimide in combination with a difunctional crosslinkable monomer.

12 Claims, No Drawings

CROSSLINKER FOR MODIFIED ASPHALT

CROSS-REFERENCE TO RELATED APPLICATIONS

The present application is a continuation of U.S. application Ser. No. 10/634,472, filed on Aug. 4, 2003 now abandoned, the contents of which are incorporated herein by reference.

FIELD OF THE INVENTION

The present invention is directed to compositions and methods for providing an improved means of modifying asphalt with a polymer. More particularly, this invention provides a crosslinking system to improve the properties of polymer modified asphalt. The invention is applicable to polymer added to asphalt in a reactive solvent or as a solid.

BACKGROUND OF THE INVENTION

The adhesive and waterproofing properties of asphalt have been known for centuries. Of the many applications of asphalt today, most asphalt derived from petroleum is used as paving material, commonly called asphalt cement. Asphalt (bitumen) is mixed with aggregate (rock) for use in paving.

Asphalt cement compositions must meet certain performance criteria or specifications to be considered useful for road paving. State and federal agencies issue specifications for various asphalt applications including specifications for use as road pavement. Performance standards are set forth in various standards of the American Society for Testing and Materials (ASTM) and the American Association of State Highway and Transportation Officials (AASHTO). Current Federal Highway Administration specifications designate an asphalt as meeting defined parameters relating to properties such as performance grading, viscosity, toughness, tenacity, and elastic recovery. Each of these parameters defines an important feature of an asphalt composition. Compositions failing to meet one or more of these parameters may be unacceptable for use as road pavement material.

More specifically, asphalt cement is viscoelastic in nature and its behavior is dependent on both temperature and loading. In hot conditions, asphalt cement acts as a viscous liquid and is subject to viscous flow. Under these conditions, less viscous hot mix asphalt pavements flow under repeated wheel loading to form ruts. Such permanent deformation is called rutting. In cold climates or under rapidly applied loads, asphalt cement behaves like an elastic solid. If stressed beyond the material's capacity, such elastic solids may break. Some asphalt cements may become too brittle and crack when excessively loaded, resulting in low temperature cracking. Neither of these conditions is desirable in an asphalt cement.

Conventional asphalt compositions frequently cannot meet all of the requisite specifications, and damage to the resulting road can occur, such as permanent deformation, thermally induced cracking, and fatigue cracking. Conventional asphalts can be modified, however, with other substances to improve their performance properties. A wide variety of polymers have been used in this regard.

Polymer modified asphalt ("PMA") has become common in road paving and roofing and may represent as much as 20% of all asphalt used today. Improvements in rutting resistance, thermal cracking, fatigue damage, stripping, and temperature susceptibility have led polymer modified binder to be substituted for asphalt in many paving applications, including hot mix, cold mix, chip seals, hot and cold crack filling, patching, and slurry seal. PMAs are used wherever performance and durability are desired. Asphalt specifiers are finding that many of the Superpave binder grades need polymer modification to meet all the requirements for high temperature rutting resistance and thermal cracking resistance at low temperatures. Superpave, which stands for Superior Performing Asphalt Pavements, represents an improved, standardized system for specifying, testing, and designing asphalt materials.

Common polymers used for asphalt modification include styrene-butadiene block copolymers, styrene-isoprene block copolymers, ethylene-vinyl/acetate copolymers, polyethylene, and polypropylene. Typically, polymer addition involves addition of solid polymer, possibly after grinding, to a rear-shear mixing vessel containing asphalt generally heated above 325° F. for a period of time to assure thorough mixing. This tends to be a labor and capital intensive process.

Despite the benefits of adding polymers to asphalt to improve physical and mechanical performance, polymers alone may not optimize asphalt performance. Also, the cost of adding polymer to the asphalt at levels sufficiently high to meet desired specifications may be prohibitive. As a result, the industry has developed chemical agents that enhance the performance of the polymer modifiers. Many of these agents have been termed crosslinkers and are widely used in the industry. They are believed to either crosslink the polymer to the asphaltene component of the asphalt or crosslink the polymer and improve properties. Improvements include superior performance in penetration, ductility, phase angle tests, as well as increased Strategic Highway Research Program (SHRP) grading. Use of chemical agents can result in more efficient utilization of the polymer, thus reducing the required level of polymer loading. There also may be improved compatibility between the polymer and the asphalt resulting in less separation of the polymer.

The earliest crosslinking systems involved use of sulfur. U.S. Pat. No. 4,130,516 discloses an asphalt polymer composition obtained by hot-blending asphalt with 3% to 7% by weight of elemental sulfur and 0.5% to 1.5% by weight of a natural or synthetic rubber. U.S. Pat. No. 3,803,066 discloses a process for preparing a rubber modified asphalt by blending the rubber in amounts up to 10% by weight, and blending into the mix an amount of sulfur such that the weight ratio of sulfur to rubber is between 0.3 and 0.9. A catalytic quantity of a free radical vulcanization accelerator is then added to effect vulcanization.

A more recent patent involving sulfur is U.S. Pat. No. 6,180,697, which describes the use of a thermoplastic elastomer in concert with crosslinking formulations that include elemental sulfur, zinc-2-mercaptobenzothiazole, zinc oxide, and dithiodimorpholine. U.S. Pat. No. 6,407,152 describes a crosslinker including two components. One component is a thiopolymer prepared by the reaction of butyl cresol and sulfur dichloride and the other component may be selected from the group consisting of elemental sulfur, polythimorpholine, zinc-2-mercaptothiazole, and mixtures thereof.

U.S. Pat. No. 6,057,390 describes a method for improved high temperature performance of asphalt comprising addition of a crosslinkable polymer (i.e., SBS triblock copolymer) and addition of dioxime of 1,4-benzoquinone or derivatives and optionally free radical initiators (i.e., organic peroxides). Another crosslinker for rubber modified asphalt compositions is provided by U.S. Pat. No. 6,486,236. The rubber includes at least a polydiene and may include vinyl-substituted aromatic monomer units. The rubber is cured by a bismaleimide to improve softening points of the asphalt.

Asphalt has also been modified by the addition of polymerizabie monomers to impact physical properties of the asphalt. A process is taught by U.S. Pat. No. 3,547,850 for producing polymer-asphalt compositions that have a high softening point and improved penetration ratio, by effecting a polymerization in hot asphalt. This patent claims addition of an alkali metal (as a catalyst or initiator) and a monomer selected from the group consisting of conjugated dienes containing 4–12 carbons and vinyl substituted aromatic compounds, in heated asphalt to effect the polymerization of used monomers therein.

Another modified system has been described in U.S. Pat. No. 4,273,685 to aid the compounding of asphalt systems with fillers such as glass fibers. This describes asphalt that has been reacted with a polymerizable vinyl monomer and a rubbery polymer added separately. The reaction is carried out at a temperature at which the vinyl aromatic monomer and the rubbery polymer react with the asphalt. Improved bonding of chemical modified asphalts with reinforcing fillers was also noted in U.S. Pat. No. 4,332,705, which claims asphalt reacted with a polymerizable monofunctional vinyl aromatic monomer such as styrene, a polyfunctional polymerizable vinyl aromatic monomer such as divinylbenzene, and a rubbery polymer added separately.

Yet another factor for consideration in asphalt compositions is the use of solvents. Solvents have been used to fluidize asphalt polymer compositions, such as with small amounts of sulfur, as in U.S. Pat. No. 4,242,246. Such solvents also may be used to fluidize polymers. The use of large amounts of solvents, however, may lower the viscosity of the resulting asphalt compositions such that they become too soft for road paving applications. In contrast, the incorporation of solid rubbers directly into asphalt presents process and handling difficulties and the uniformity of the final composition is often difficult to achieve-or control. Separation of the solid polymer from the asphalt is also problematic. It is therefore desirable to develop compositions and methods for adding polymers to asphalt in a reactive monomer solvent in order to improve processing, achieve and sustain compositional uniformity, while improving or at least not compromising requisite asphalt properties.

SUMMARY OF THE INVENTION

The present invention generally describes a material or combination of materials that is added to polymer modified asphalt to improve the properties of the final asphalt product. More particularly, the invention involves the use of reactive materials classified as bismaleimides, alone or in combination with other components, such as crosslinkers and radical initiators. The bismaleimides provide enhanced properties by reacting with the added polymer and/or asphalt to form cross-linked systems. The bismaleimides may be added directly (neat or in a solvent solution) or may be added as part of the polymer composition, i.e. a polymer/monomer/bismaleimide solution.

While some embodiments of the present invention are directed to adding the polymer to asphalt as a solid, others involve addition of the polymer as part of a composition that includes the polymer dissolved reactive monomer.

In particular, the asphalt compositions of the present invention include asphalt, a rubber or elastomeric polymer present in an amount no greater than about 12% by weight of the asphalt composition, and at least one crosslinkable component present in an amount of about 0.05% to about 3% of the asphalt composition. The crosslinkable component is a bismaleimide or a bismaleimide in combination with a difunctional crosslinkable monomer.

The present invention is also directed to methods of treating asphalt compositions. Such methods include the steps of heating the asphalt, adding a rubber or elastomeric polymer to the heated asphalt, and adding at least one crosslinkable component to the heated asphalt, thereby curing the rubber or elastomeric polymer. The crosslinkable component is a bismaleimide or a bismaleimide in combination with a difunctional crosslinkable monomer.

Moreover, the present invention includes methods of treating a polymer modified asphalt composition, including the step of adding at least one crosslinkable component to the modified asphalt composition. The crosslinkable component is a bismaleimide or a bismaleimide in combination with a difunctional crosslinkable monomer.

Optimally, the use of reactive monomer solvents to carry the polymer may be employed and the polymer/monomer solution added to the asphalt, as described in commonly assigned U.S. Pat. No. 7,045,570, which is incorporated herein by reference.

DETAILED DESCRIPTION OF THE INVENTION

One aspect of the present invention relates to the addition of bismaleimides to polymer modified asphalt to improve the properties thereof. The bismaleimides may be added directly to the asphalt or as part of a polymer/monomer solution. Moreover, additional components, such as crosslinkers or radical initiators may be added in combination with the bismaleimides to further enhance properties of the asphalt.

Another aspect of the present invention, relates to the discovery that a polymer composition, which is normally a solid by nature, can be added to heated asphalt by dissolving it in a polymerizable monomer to facilitate addition as a liquid. The monomer polymerizes under the addition conditions and overcome problems associated with use of solvents in asphalt. This method also overcomes the significant solids handling issues associated today with the addition of polymer solids. As such, embodiments of the present invention desirably include a pre-formulated solution of a polymer for modifying asphalt dissolved in a polymerizable monomer, which represents a pumpable fluid that can be used to feed to an asphalt system.

The polymer used in the compositions of the present invention may be any of rubber, elastomeric or thermoplastic polymers or thermosetting resins typically used to modify the properties of asphalt. Conventionally utilized rubber or elastomeric polymers include block copolymers, synthetic and natural rubbers, and fibers, among others. Examples of suitable polymers include styrene-butadiene copolymer, styrene-isoprene copolymers, ethylene/vinyl acetate copolymers, polydiene, polyethylene, and polypropylene. Diene contributed monomer units may include 1,3-butadiene, isoprene, 2,3-dimethyl-1,3-butadiene, and 1,3-pentadiene. Suitable rubber or elastomeric polymers desirably are present in amounts of about 12% or less by weight of the asphalt composition.

It is desirable to employ styrene-butadiene block copolymers, particularly styrene-butadiene-styrene block copolymer ("SBS"), due to their widespread acceptance in the asphalt industry. Specific styrene-butadiene polymer examples include Stereon (available from Firestone), Finaprene (available from Atofina), and Kraton (available from Kraton) product lines. Molecular weights of the polymers desirably may range from about 20,000 to 500,000.

Additional monomer units may include vinyl-substituted aromatic hydrocarbons. Such monomer units may include styrene, α-methylstyrene, 1-vinylnaphthalene, 2-vinylnaphthalene, 1-α-methyl vinylnaphthalene, 2α-methyl vinylnaphthalene, as well as alkyl cycloalkyl, aryl, alkaryl, and aralkyl derivatives thereof, and di-or tri-vinyl-substituted aromatic hydrocarbons.

The polymerizable monomer used as a solvent in the compositions of the present invention may be styrene. Styrene is desirable because it is inexpensive and readily polymerizable. Furthermore, styrene is highly compatible with SBS polymers typically used to modify asphalt. Other easily handled monomeric materials, such as N-vinylpyridine, N-vinyl-2-pyrolidone, α-methylstyrene, vinylnaphthalene, or alkylated styrene or mixtures thereof also may be employed.

In some embodiments of the present invention, additional components may be added to the asphalt compositions. Additional polymerizable materials, either in liquid form or dissolvable in the monomer, may be added alone or in combination with the monomers. Such materials may improve the physical properties of the polymer solution or provide superior properties to the resulting asphalt. For example, crosslinking agents, such as divinylbenzene, can be added with the polymer/monomer mixture.

More particularly, the polymer solution may contain asphalt additives that are used to crosslink the polymer in and/or with the asphalt. Crosslinking reagents typically result in improved high temperature viscosities, better compatibility of the polymer with the asphalt, and reduced polymer loading. For example, crosslinking agents may include sulfur donators as described in U.S. Pat. No. 6,047,152, or bismaleimides as described in U.S. Pat. No. 6,486,236, each of which is incorporated herein by reference.

Polymer modified compositions of the present invention desirably include a combination of difunctional crosslinking materials, and optionally other additives such as initiators. These components are added either directly to the asphalt (neat or in a premix solution), or are included in the polymer/monomer solution, resulting in superior properties of the asphalt. Such asphalt compositions may exhibit improved dynamic shear rheometer values, such that the asphalt is more viscous at higher temperatures. The asphalt compositions also may exhibit a higher softening point, higher toughness and tenacity values, and better elastic recovery, among other benefits.

One such crosslinking component that may be added to asphalt is a difunctional monomer capable of polymerizing, generally by radical initiation, to form crosslinked polymer systems. Examples include, but are not limited to, divinylbenzene, diallylphthalate, diallylmaleate, ethoxylated bisphenol A dimethacrylate, polyethylene glycol dimethacrylate, polyethylene glycol diacrylate, and polybutadiene dimethacrylate. Useful ranges of crosslinking components may range from 0.1% to 3% by weight of the asphalt composition, more desirably 0.5% to 1% by weight.

A second crosslinking component may be added alone or in combination with the first crosslinking component. The second component may be a difunctional compound capable of reacting twice with appropriate functional groups, such as compounds that can react with olefins via reactions called ene reactions. Such compounds can thus couple two unsaturations, which may be available in a polymer, such as, for example, a polybutadiene, or in the asphaltene structures of the asphalt. A particularly desirable example of such compounds is the class of compounds called bismaleimides.

Suitable bismaleimides for use in the compositions of the present invention are represented, without limitation, by the following formulas:

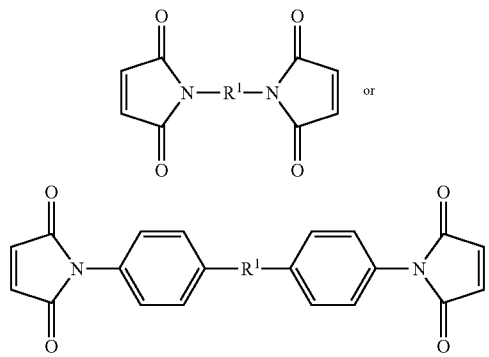

wherein $R^1$ may be an aromatic group, an aliphatic group, a cycloaliphatic group, or an aliphatic group containing siloxane. Any bismaleimide, however, known to those of skill in the art may be used.

Specific examples of suitable bismaleimides include, but are not limited to, N,N'-m-phenylene-bis-maleimide, N,N'-hexamethylene-bis-maleimide, N,N'-octamethylene-bis-maleimide, N,N'-4,4"-diphenylmethane-bis-maleimide, N,N'-ethylene-bis-maleimide, N,N'-butylene-bis-maleimide, N,N'-phenylene-bis-maleimide, N,N'-4, 4'-diphenyl ether-bis-maleimide; N,N'-4,4'diphenyl sulfone-bis-maleimide, N,N'-4,4'-dicyclohexyl methane-bis-maleimide, N,N'-xylylene-bis-maleimide, N,N'-diphenyl cyclohexane-bis-maleimide, N,N'-(p-phenylene)-bismaleimide, N,N'-(p-tolylene) bismaleimide, N,N'-(methylenedi-p-phenylene)-bismaleimide, N,N'-(oxydi-p-phenylene)bismaleimide, α,α,-bis-(4-phenylene)-bismaleimide, N,N'-(m-xylylene) bis-citraconimide, α,α-bis-(4-maleimidophenyl)-meta-di-isopropylbenzene, and mixtures thereof. Useful ranges of bismaleimides include from 0.05% to 3% by weight of the asphalt composition, more desirably 0.1% to 2% by weight, and even more desirably 0.2% to 0.8% by weight.

Each difunctional crosslinking component or combination of components may be added to the asphalt independently, directly to or in a separate solvent solution or carrier, or may be added as part of the polymer/monomer solution. For example, bismaleimide crosslinkers first may be dissolved in a solvent, such as, but not limited to vinyl pyrrolidone, styrene, or N-vinylpyridine, prior to addition to the asphalt. In some embodiments, the rubber or elastomeric polymer may be added directly to the asphalt as a conventional solids addition. In such embodiments, the crosslinker(s) also may be added directly to the asphalt composition rather than in a polymer/monomer solution.

The asphalt compositions of the present invention may further include a free radical initiator. It may be advantageous to treat the asphalt composition with a free radical initiator, for example, to assist in the complete reaction of the polymerizable monomer and/or crosslinkers. Suitable initiators include, but are not limited to, molecular classes of peroxides, hydroperoxides, and azo compounds. Specific examples are di-tert-butylperoxide and cumenyl hydroperoxide. Initiator materials may be chosen based on the treatment temperature of the asphalt and/or the decomposition temperature of the initiator, thus to release the free radicals over the heated hold period. The initiator may be added independently or as part of the polymer/monomer solution at the reaction temperature or, alternatively, after some period of time up to 24 hours later. Useful ranges of initiators include from 0.1% to 2% by weight of the asphalt composition, more desirably about 0.4% by weight.

Other additives, such as inhibitors, also may be added to the asphalt compositions of the present invention. Suitable inhibitors include, but are not limited to, t-butylcatechol, hydroquinone, hydroxyl-TEMPO, quinonemethides, diethylhydroxylamine, and combinations thereof.

The present invention also relates to methods of preparing asphalt compositions. In accordance with such methods, the rubber or elastomeric polymer may be added to the asphalt by first dissolving the polymer in a polymerizable monomer and, subsequently, feeding the solution to the asphalt as a liquid. The reactive solvent will "disappear", i.e. be integrated, in the asphalt matrix and the resulting polymer will contribute to final asphalt properties. Addition desirably is performed to asphalt that is heated, thus initiating polymerization. Temperatures desirably range from about 200° F. to 600° F. Completion of the polymerization is dependent on the temperature, i.e., longer cure time is needed for lower temperatures.

The polymer solutions prepared in accordance with the present invention may be added to asphalt at various times or locations. For example, it may be desirable to add the polymer solution in asphalt rundown lines at the refinery or heated storage tanks. Addition to process rundown conditions provides good agitation for thorough mixing of the polymer with the asphalt. This is a further advantage over addition of solid polymer, which is problematic due to reliance on high shear mixers for thorough mixing.

Furthermore, the addition of SBS polymer alone to asphalts can be problematic because the polymer tends to separate upon continued heating. Polymerizing reactive monomers such as styrene into the asphalt matrix, as in the present invention, provides improved stability of the polymer asphalt solution with reduced separation.

The polymer solution described herein may also contain small amounts of oils used to enhance asphalt properties. Such aromatic oils may result from furfural extraction processes and are known by those of ordinary skill in the art to improve the low temperature properties of asphalt. One example is Hydrolene Oils, available from Sunoco, Inc.

EXAMPLES

Example 1

In an exemplary example, 400 g of PG 64-22 asphalt (available from a Northeast U.S. refinery) was heated to approximately 400° F. Added to the asphalt were solutions of SB polymer Stereon 210 (3% by weight) (available from Firestone Polymer) dissolved in styrene and divinylbenzene, as listed for samples R–V in Table 1 below (amounts given as weight % of asphalt). Further additions of TBP initiator as well as crosslinker Vanax MBM (N,N'-m-phenylene bismaleimide) were performed. The resulting mixtures were blended with a blender at 7,000 rpm for 5 minutes. The solutions were subsequently heated for 3 days at 300° F.

The solutions were tested for various asphalt properties, including softening point, toughness, and tenacity. Softening point was measured in accordance with ASTM D36–95, which is incorporated herein by reference in its entirety. Softening point is indicative of the tendency of the asphalt material to flow at elevated temperatures. Desirably, the softening point of the asphalt compositions of the present invention is between about 45° C. and 95° C.

Toughness and tenacity were measured according to ASTM D 5801, which is incorporated herein by reference in its entirety. Tensile testing methods are described in U. Isacsson et al., "Testing and appraisal of polymer modified road bitumens—state of the art," 28 *Materials and Structures* 139,154 (1995) and L. H. Lewandowski, "Polymer Modification of Paving Asphalt Binders," 67 *Rubber Chemistry and Technology* 447, 456 (1994), each of which is incorporated herein by reference in its entirety. According to these methods, a hemispherical tension head is imbedded in hot molten asphalt, allowed to cool, and pulled at a specified rate to produce a load-deformation (stress-strain) curve. The entire area under the curve represents the toughness of the asphalt sample, while the area under the long-pull portion represents the tenacity.

The solutions also were tested for SHRP grade. SHRP binder specifications involve measurement of rheological properties (e.g., complex shear modulus, phase angle, flexural creep stiffness) of asphalt compositions at different temperatures under controlled conditions. A dynamic shear rheometer is used for higher temperature measurements, while a bending beam rheometer is used for lower temperatures, as outlined in *Lewandowski*, at 467.

The results of the asphalt testing for samples A–D are provided in Table 1 below. Reduction of the divinylbenzene or Vanax crosslinker resulted in asphalt exhibiting performance properties similar to those of neat asphalt (represented by sample A), which is unmodified asphalt.

TABLE 1

| Component | A | B | C | D |
| --- | --- | --- | --- | --- |
| Asphalt (g) | 400 | 400 | 400 | 400 |
| Divinylbenzene (wt %) | 0 | 1.1 | 0.54 | 0.18 |
| Crosslinker[1] (wt %) | 0 | 0.8 | 0.8 | 0.8 |
| Initiator[2] (wt %) | 0 | 0.5 | 0.5 | 0.5 |
| Styrene (wt %) | 0 | 3.15 | 3.82 | 4.28 |
| SHRP grade (° C.) | 68 | 79 | 73 | 71 |
| Softening point (° F.) | 125.5 | 142.7 | 133.0 | 124.8 |
| Toughness (in-lbs) | 85 | 289 | 186 | 114 |
| Tenacity (in-lbs) | 19 | 206 | 139 | 83 |

[1]Vanax MBM (available from R.T. Vanderbilt Co., Inc.)
[2]Tert-butylperoxide

Example 2

In an exemplary example, 400 g of PG 64-22 asphalt (available from a Northeast U.S. refinery) was heated to approximately 400° F. Added to the asphalt were solutions of SBS polymer Stereon 841A (3% by weight) (available from Firestone Polymers) dissolved in styrene and divinylbenzene, as listed for samples E–M in Table 5 below. Further additions of TBP initiator and crosslinker Vanax MBM (N,N'-m-phenylene bismaleimide) were performed, in the amounts shown in Table 2. The resulting mixtures were blended with a blender at 7,000 rpm for 5 minutes. The solutions were subsequently heated for 3 days at 300° F.

The solutions were tested for various asphalt properties, including SHRP grade, softening point, toughness, and tenacity, as described above. The results of the asphalt testing are given in Table 2. Reducing the Vanax MBM crosslinker or the TBP initiator resulted in asphalt hardly better than the neat asphalt (represented by sample E).

TABLE 2

| Component | E | F | G | H | I | J | K | L | M |
|---|---|---|---|---|---|---|---|---|---|
| Asphalt (g) | 400 | 400 | 400 | 400 | 400 | 400 | 400 | 400 | 400 |
| Divinylbenzene (wt %) | 0 | 0.73 | 0.73 | 0.73 | 0.73 | 0 | 0.73 | 0.73 | 0.73 |
| Crosslinker[1] (wt %) | 0 | 0.8 | 0.5 | 0.25 | 0 | 0 | 0.8 | 0.8 | 0.8 |
| Initiator[2] (wt %) | 0 | 0.5 | 0.5 | 0.5 | 0.5 | 0.5 | 0.35 | 0.2 | 0 |
| Styrene (wt %) | 0 | 2.93 | 2.93 | 2.93 | 2.93 | 3.66 | 2.93 | 2.93 | 2.93 |
| SHRP grade (° C.) | 67 | 75 | 73 | 69 | 67 | 64 | 73 | 70 | 69 |
| Softening point (° F.) | 121.0 | 128.9 | 130.0 | 123.8 | 120.4 | 115.8 | 130.3 | 124.8 | 126.0 |
| Toughness (in-lbs) | 69 | 185 | 185 | 99 | 59 | 36 | 177 | 79 | 96 |
| Tenacity (in-lbs) | 19 | 131 | 121 | 63 | 30 | 20 | 131 | 47 | 53 |

[1] Vanax MBM (availabloe from R.T. Vanderbilt Co., Inc.)
[2] Tert-butylperoxide

Example 3

In an exemplary example, 500 g of PG 64-22 asphalt (available from a Midwest U.S. refinery) was heated to approximately 375° F. Added to the asphalt was solid SB polymer Stereon (3% by weight) (available from Firestone Polymers) as listed for samples N–Q in Table 3 below. Additions of crosslinker Vanax MBM (N,N'-m-phenylene bismaleimide) were performed, in the amounts shown in Table 3. The resulting mixtures were blended with a blender at 13,000 rpm for 10 minutes. The solutions were subsequently heated for 3 days at 375° F.

The solutions were tested for various asphalt properties, including SHRP grade, softening point, toughness, and tenacity, as described above. The results of the asphalt testing are given in Table 3. The results indicate the benefit of addition of the crosslinker over polymer alone.

TABLE 3

| Component | N | O | P | Q |
|---|---|---|---|---|
| Asphalt (g) | 500 | 500 | 500 | 500 |
| Polymer (g) | 0 | 20 (S-841A) | 20 (S-841A) | 20 (S-210) |
| Crosslinker[1] (g) | 0 | 0 | 2.5 | 4.5 |
| SHRP grade (° C.) | 66 | 72 | 75 | 81 |
| Softening point (° F.) | 122.5 | 130.0 | 135.5 | 143.5 |
| Toughness (in-lbs) | 46 | 102 | 130 | 159 |
| Tenacity (in-lbs) | 12 | 49 | 48 | 63 |

[1] Vanax MBM (available from R.T. Vanderbilt Co., Inc.)

While there have been described what are presently believed to be the certain desirable embodiments of the invention, those skilled in the art will realize that changes and modifications may be made thereto without departing from the spirit of the invention, and it is intended to include all such changes and modifications as fall within the true scope of the invention.

What is claimed is:

1. An asphalt composition comprising:
   asphalt;
   a rubber or elastomeric polymer present in an amount no greater than about 12% by weight of said asphalt composition;
   at least one crosslinkable component present in an amount of about 0.05% to about 3% of said asphalt composition, wherein said component is selected from the group consisting of a bismaleimide and a bismaleimide in combination with a difunctional crosslinkable monomer; and
   a polymerizable monomer solvent in which said crosslinkable component is dissolved prior to addition to said asphalt.

2. The asphalt composition according to claim 1, wherein said difunctional crosslinkable monomer is selected from the group consisting of divinylbenzene, diallylphthalate, diallymaleate, ethoxylated bisphenol A dimethacrylate, polyethylene glycol dimethacrylate, polyethylene glycol diacrylate, polybutadiene dimethacrylate, and combinations thereof, and wherein said difunctional crosslinkable monomer is present in an amount of about 0.1% to about 3% by weight of said asphalt composition.

3. The asphalt composition according to claim 1, wherein said solvent is selected from the group consisting of styrene, N-vinylpyridine, vinyl pyrrolidone, and combinations thereof.

4. The asphalt composition according to claim 1, further comprising a free radical initiator.

5. The asphalt composition according to claim 4, wherein said free radical initiator is selected from the group consisting of peroxides, hydroperoxides, peroxyesters, and azo compounds.

6. A method of treating a polymer modified asphalt composition, comprising the steps of:
   dissolving at least one crosslinkable component in a polymerizable monomer solvent; and
   adding the at least one crosslinkable component to the modified asphalt composition,
   wherein the crosslinkable component is selected from the group consisting of a bismaleimide and a bismaleimide in combination with a difunctional crosslinkable monomer.

7. A method of treating an asphalt composition, comprising the steps of:
   heating the asphalt;
   dissolving a rubber or elastomeric polymer in a polymerizable monomer solvent to form a polymer solution;
   adding the polymer solution to the heated asphalt; and
   adding at least one crosslinkable component to the heated asphalt, thereby curing the rubber or elastomeric polymer, wherein the crosslinkable component is selected from the group consisting of a bismaleimide and a bismaleimide in combination with a difunctional crosslinkable monomer.

8. The method according to claim 7, wherein the step of adding at least one crosslinkable component to the heated asphalt further comprises the step of adding the at least one crosslinkable component into the polymer solution prior to adding the solution to the heated asphalt.

9. The method according to claim 7, further comprising the step of adding a free radical initiator to the asphalt composition.

10. The method according to claim 7, further comprising the step of adding an aromatic oil to the heated asphalt to improve low temperature performance of the asphalt.

11. The method according to claim 10, wherein the aromatic oil is chosen from furfural extraction products.

12. An asphalt composition comprising:
asphalt;
a rubber or elastomeric polymer present in an amount no greater than about 12% by weight of said asphalt composition;
a first crosslinkable component comprising a difunctional crosslinkable monomer selected from the group consisting of divinylbenzene, diallylphthalate, diallymaleate, ethoxylated bisphenol A dimethacrylate, polyethylene glycol dimethacrylate, polyethylene glycol diacrylate, polybutadiene dimethacrylate, and combinations thereof; and
a second crosslinkable component comprising a bismaleimide,
wherein said first and said second crosslinkable components are present in an amount of about 0.05 % to about 3% of said asphalt composition.

* * * * *

UNITED STATES PATENT AND TRADEMARK OFFICE
CERTIFICATE OF CORRECTION

PATENT NO. : 7,205,344 B2
APPLICATION NO. : 10/841596
DATED : April 17, 2007
INVENTOR(S) : Goliaszewski et al.

It is certified that error appears in the above-identified patent and that said Letters Patent is hereby corrected as shown below:

On the Title page at (74), the printed patent should read --Hoffmann & Baron, LLP--.

At column 3, lines 3-4, the printed patent should read --...polymerizable monomer..--.

At column 9, Table 2, the printed patent should read

-- TABLE 2

| Component | E | F | G | H | I | J | K | L | M |
|---|---|---|---|---|---|---|---|---|---|
| Asphalt (g) | 400 | 400 | 400 | 400 | 400 | 400 | 400 | 400 | 400 |
| Divinylbenzene (wt %) | 0 | 0.73 | 0.73 | 0.73 | 0.73 | 0 | 0.73 | 0.73 | 0.73 |
| Crosslinker1 (wt %) | 0 | 0.8 | 0.5 | 0.25 | 0 | 0 | 0.8 | 0.8 | 0.8 |
| Initiator2 (wt %) | 0 | 0.5 | 0.5 | 0.5 | 0.5 | 0.5 | 0.35 | 0.2 | 0 |
| Styrene (wt %) | 0 | 2.93 | 2.93 | 2.93 | 2.93 | 3.66 | 2.93 | 2.93 | 2.93 |
| SHRP grade (°C) | 67 | 75 | 73 | 69 | 67 | 64 | 73 | 70 | 69 |
| Softening point (°F) | 121.0 | 128.9 | 130.0 | 123.8 | 120.4 | 115.8 | 130.3 | 124.8 | 126.0 |
| Toughness (in-lbs) | 69 | 185 | 185 | 99 | 59 | 36 | 177 | 79 | 96 |
| Tenacity (in-lbs) | 19 | 131 | 121 | 63 | 30 | 20 | 131 | 47 | 53 |

1 Vanax MBM (available from R.T. Vanderbilt Co., Inc.)
2 Tert-butylperoxide --.

Signed and Sealed this

Tenth Day of July, 2007

JON W. DUDAS
*Director of the United States Patent and Trademark Office*